US007676635B2

(12) United States Patent
Newport et al.

(10) Patent No.: US 7,676,635 B2
(45) Date of Patent: Mar. 9, 2010

(54) RECOVERABLE CACHE PRELOAD IN CLUSTERED COMPUTER SYSTEM BASED UPON MONITORED PRELOAD STATE OF CACHE

(75) Inventors: William Thomas Newport, Rochester, MN (US); Kevin William Sutter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/564,420

(22) Filed: Nov. 29, 2006

(65) Prior Publication Data

US 2008/0126706 A1 May 29, 2008

(51) Int. Cl.
*G06F 12/00* (2006.01)
(52) U.S. Cl. .................. 711/137; 711/118; 711/144; 711/156; 714/5
(58) Field of Classification Search .................. 711/137, 711/118, 144, 156; 714/5
See application file for complete search history.

(56) References Cited

U.S. PATENT DOCUMENTS 6,098,096 A * 8/2000 Tsirigotis et al. ............ 709/213

| 6,370,614 | B1 * | 4/2002 | Teoman et al. | 711/113 |
| 6,463,509 | B1 * | 10/2002 | Teoman et al. | 711/137 |
| 2006/0129766 | A1 * | 6/2006 | Cassia et al. | 711/137 |
| 2007/0091874 | A1 * | 4/2007 | Rockel et al. | 370/352 |

OTHER PUBLICATIONS

Bakalova et al., "WebSphere Dynamic Cache: Improving J2EE application performance," IBM Systems Journal, vol. 43, No. 2, pp. 351-370, 2004.*

* cited by examiner

*Primary Examiner*—Stephen C Elmore
(74) *Attorney, Agent, or Firm*—Wood, Herron & Evans, LLP

(57) ABSTRACT

An apparatus, program product and method monitor the state of a cache during a cache preload operation in a clustered computer system such that the monitored state can be used after a failover to potentially avoid the need to restart the cache preload operation from the beginning. In particular, by monitoring the state of the cache during a cache preload operation, any data that has been preloaded into a cache prior to a failure may be retained after a failover occurs, thus enabling the cache preload operation to continue from the point at which it was interrupted as a result of the failure.

25 Claims, 3 Drawing Sheets

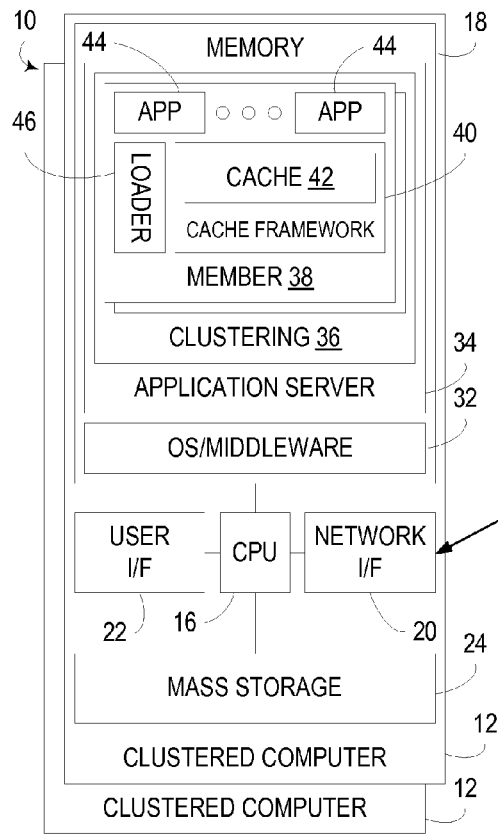
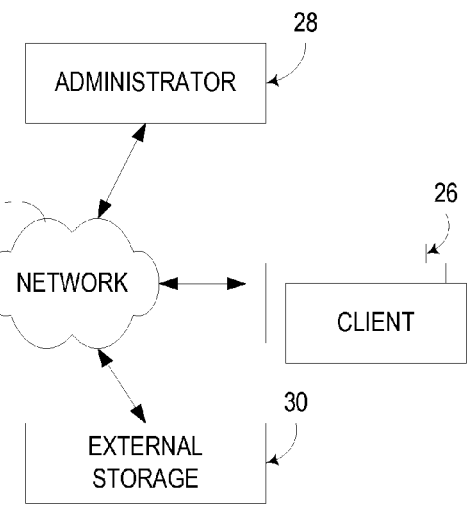
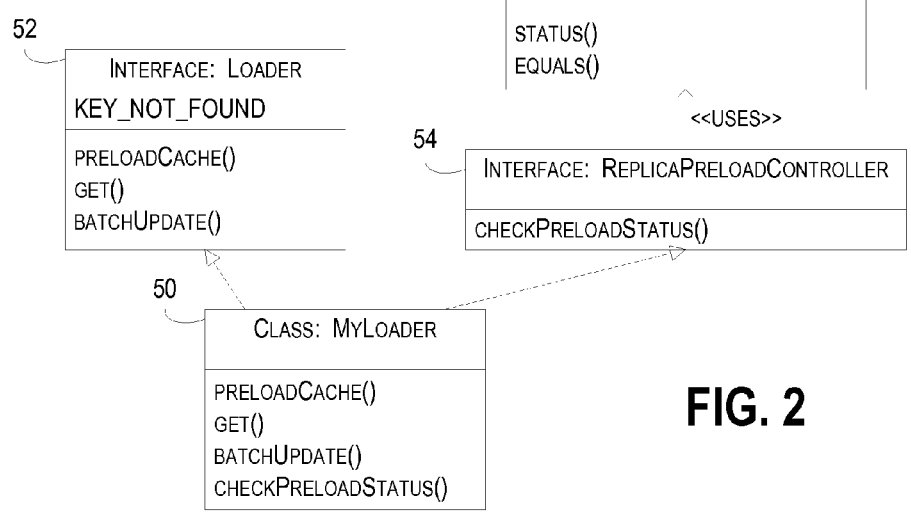
FIG. 1
FIG. 2

RECOVERABLE CACHE PRELOAD IN CLUSTERED COMPUTER SYSTEM BASED UPON MONITORED PRELOAD STATE OF CACHE

FIELD OF THE INVENTION

The invention is generally directed to computers and computer software, and in particular, to the preloading of a cache in a clustered computer system.

BACKGROUND OF THE INVENTION

Distributed computing systems have found application in a number of different computing environments, particularly those requiring high performance and/or high availability and fault tolerance. In a distributed computing system, multiple computers connected by a network are permitted to communicate and/or share workload. Distributed computing systems support practically all types of computing models, including peer-to-peer and client-server computing.

One particular type of distributed computing system is referred to as a clustered computing system. "Clustering" generally refers to a computer system organization where multiple computers, or nodes, are networked together to cooperatively perform computer tasks. An important aspect of a computer cluster is that all of the nodes in the cluster present a single system image—that is, from the perspective of a client or user, the nodes in a cluster appear collectively as a single computer, or entity. In a client-server computing model, for example, the nodes of a cluster collectively appear as a single server to any clients that attempt to access the cluster.

Clustering is often used in relatively large multi-user computing systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

In many clustered computer systems, the services offered by such systems are implemented as managed resources. Some services, for example, may be singleton services, which are handled at any given time by one particular node, with automatic failover used to move a service to another node whenever the node currently hosting the service encounters a problem. Other services, often referred to as distributed services, enable multiple nodes to provide a service, e.g., to handle requests for a particular type of service from multiple clients.

Clustered computer systems often establish groups, or clusters, of nodes to provide specific services. The nodes that participate in a group or cluster, or alternatively, the specific instances of the associated service running on such nodes, are typically referred to as "members" of the group or cluster. In some groups or clusters, one member is designated a primary member, with the other members designated as backup or replica members, which are each capable of assuming the responsibility of a primary member whenever a failure occurs in that primary member.

One service that may be supported by a clustered computer system is a cache framework. A cache framework, which is a type of cache, generally provides for rapid access to frequently used data by retaining the data in a volatile memory such as the main storage of one or more computers in a clustered computer system. A cache framework may be object-based and transactional in nature, and often supports very large cache sizes. A cache framework can greatly improve performance in a clustered computer system by reducing the access time for frequently accessed data requested by clients of the cache framework (e.g., other services and applications running in the clustered computer system and/or clients of the clustered computer system).

Like any cache, the performance gains provided by a cache framework are realized when requested data is already stored in the cache framework, such that the overhead associated with retrieving the data from a slower, non-volatile memory such as an external, backend data repository is avoided. Some cache frameworks rely on a technique known as "lazy loading," where data is not loaded into a cache framework until the first time the data is requested. With lazy loading, the initial request incurs the overhead of loading the data into the cache framework, and as a result, the benefits of the cache framework are not realized until the second and subsequent requests are made for the data. In addition, in some applications that are subject to uneven workloads, e.g., application that receive a proportionately large number of client requests at particular times of the day, lazy loading can place a severe burden on a cache framework as well as any backend data repository, leading to poor response times and decreased performance.

One approach that has been used in a cache framework to address the performance penalties associated with lazy loading is to perform a preload of the cache framework, e.g., during the initialization of a clustered computer system. By preloading frequently used data into a cache framework, the initial performance penalty associated with lazy loading is often avoided, resulting in faster access and better performance, as well as reduced stress on the cache framework and any backend data repositories during periods of heavy workload.

Preloading a cache framework, however, does require substantial system resources, given that all of the data preloaded into a cache framework typically must be retrieved from a comparatively slow backend data repository. For example, in some systems it may take on the order of several hours to preload a large cache (e.g., with one or more gigabytes of data).

The preloading of a cache framework is typically managed by a primary member in the group or cluster that hosts a cache framework. In some instances, however, a primary member may encounter a failure during a cache framework preload operation, either as a result of a failure in the primary member or another failure in the node upon which the primary member resides, which may necessitate that a failover be performed to a backup or replica member.

In conventional cache frameworks, the failover to a backup or replica member prior to completion of a cache framework preload operation requires that the preload operation be restarted from the beginning. Given the substantial resources that are typically involved with preloading a cache framework, however, a considerable performance penalty can be incurred as a result of having to restart a cache framework preload operation, particularly if the failure in a primary member occurs after a substantial portion of the cache framework preload operation had already been completed. For example, should a primary member fail just before completing a preload operation, the total time required to complete the preload operation using a replica member would be roughly double the time that would be required if no failure had occurred.

Therefore, a significant need exists in the art for a manner of reducing the overhead associated with cache preload operations, and particularly for cache preload operations that are interrupted prior to completion as a result of a failure.

SUMMARY OF THE INVENTION

The invention addresses these and other problems associated with the prior art by providing an apparatus, program product and method that monitor the state of a cache during a cache preload operation in a clustered computer system such that the monitored state can be used after a failover to potentially avoid the need to restart the cache preload operation from the beginning. In particular, by monitoring the state of the cache during a cache preload operation, any data that has been preloaded into a cache prior to a failure may be retained after a failover occurs, thus enabling the cache preload operation to continue from the point at which it was interrupted as a result of the failure.

Consistent with one aspect of the invention, therefore, a cache may be preloaded in a clustered computer system by monitoring a preload state of the cache during preloading of the cache by a first member of a group, failing over to a second member of the group in response to a failure in the first member, and selectively preloading the cache with the second member based upon the preload state of the cache after failing over to the second member.

Consistent with another aspect of the invention, a cache may be in a clustered computer system by initiating preloading of the cache by a first member of a group, failing over to a second member of the group in response to a failure in the first member prior to completing the preload of the cache and after at least a portion of the cache has been preloaded, and retaining the preloaded portion of the cache and completing the preload of the cache with the second member after failing over to the second member.

Consistent with yet another aspect of the invention, a cache may be preloaded in a clustered computer system of the type including a group including first and second members, where the first member is configured to preload the cache. The cache may be preloaded by accessing a preload state of the cache with the second member after a failure has occurred in the first member and a failover to the second member has been initiated, selectively preloading the cache with the second member based upon the preload state of the cache after failing over to the second member.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a high level block diagram of a clustered computer system that supports recoverable cache preload operations consistent with the invention.

FIG. 2 is a class diagram illustrating a number of software components that implement recoverable cache preload operations in the clustered computer system of FIG. 1.

DETAILED DESCRIPTION

Figure 3:
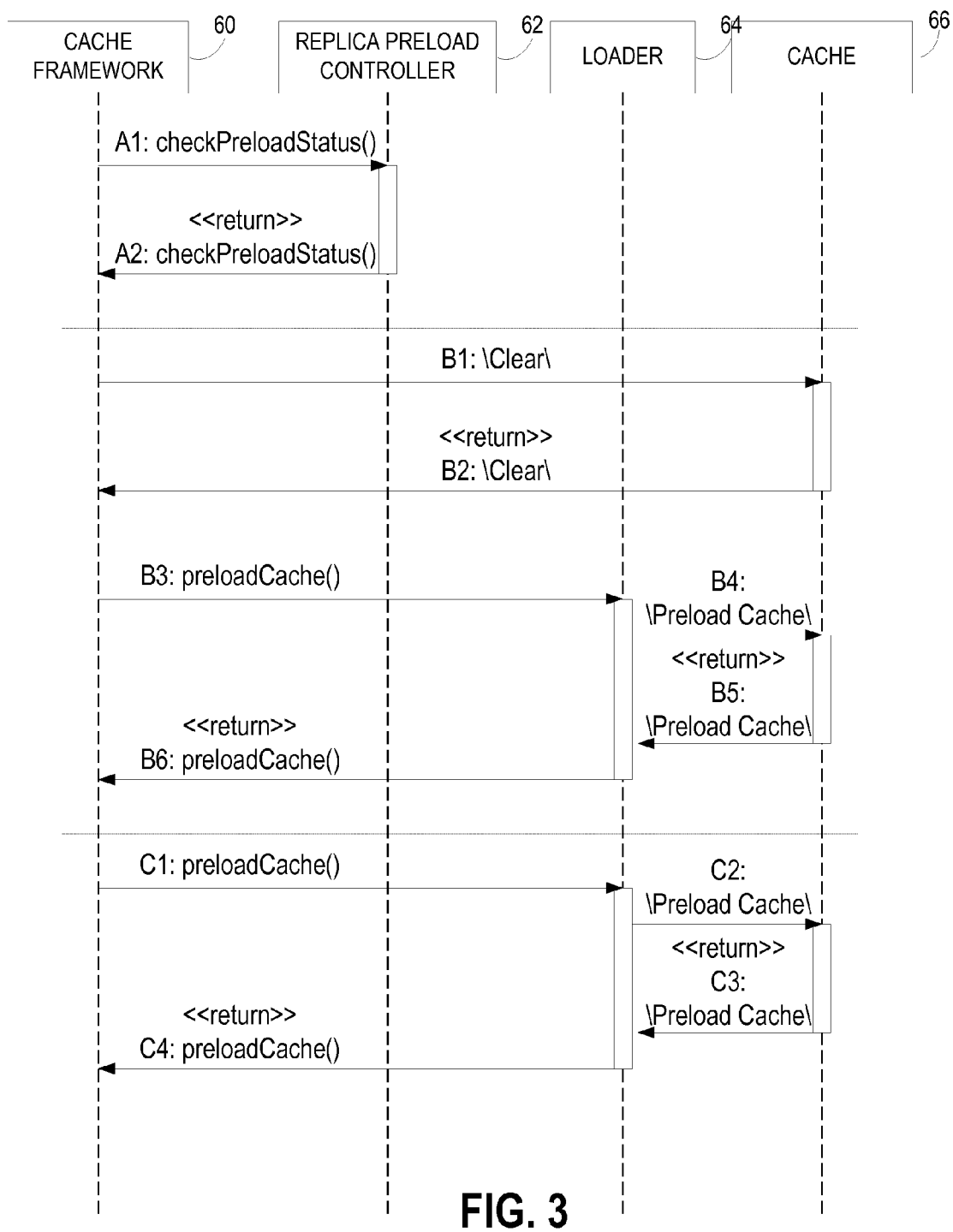
FIG. 3 is an interaction diagram illustrating the interaction between the components in the clustered computer system of FIG. 1 during a recoverable cache preload operation.

The embodiments described hereinafter utilize a recoverable cache preload operation that monitors the state of a cache during the preloading of a cache in a clustered computer system such that the monitored state can be used after a failover to potentially avoid the need to restart the cache preload operation from the beginning, e.g., by permitting some or all of the data that has been preloaded into a cache prior to a failure to be retained after a failover occurs, and enabling the cache preload operation to continue at an intermediate point at or near the point at which it was interrupted as a result of the failure.

In the illustrated embodiment, the recoverable cache preload operation is implemented within a cache framework, with the recoverable preload operation supported via a preload callback that can be used to communicate the preload state back to the cache framework. A loader component, separate from the cache framework, utilizes the preload state to determine how to preload a cache, e.g., whether to skip preloading due to preloading being completed prior to a failover, preload from an intermediate point if a portion of a preload was completed prior to a failover, or preload from the beginning if no attempt has yet been made to preload the cache or if the preload state indicates that a full preload is necessary. It will be appreciated, however, that the recoverable cache preload operation may be implemented within a wide variety of other embodiments, and thus the invention is not limited to the particular implementation described herein.

Turning now to the Drawings, wherein like numbers denote like parts throughout the several views, FIG. 1 illustrates an exemplary embodiment of a clustered computer system 10 that supports recoverable cache preload operations consistent with the invention. Computer system 10 includes a plurality of clustered computers 12 interfaced with one another via a network 14. As will be appreciated in the art, network 14 may be implemented using any combination of LAN's, WAN's, point-to-point interconnects, and/or various other networking topologies. Furthermore, network 14 may represent multiple distinct networks in some embodiments. Computers 12 may be located in close geographical proximity with one another, or may be geographically dispersed.

Each computer 12 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Each computer 12 generally includes a central processing unit (CPU) 16 including one or more system processors and coupled to a memory or main storage 18, typically through one or more levels of cache memory (not shown). Furthermore, CPU 16 may be coupled to additional peripheral components, e.g., one or more networks 14 via a network interface 20, various input/output devices (e.g., a control panel, display, keyboard, mouse and/or dedicated workstation, etc.) via a user interface 22, and mass storage 24 (e.g., a DASD or one or more disk drives). Any number of alternate computer architectures may be used in the alternative.

Also illustrated as coupled to network 14 are a plurality of client computers 26, which may be connected to clustered computers 12 via private and/or public networks such as the Internet to perform tasks using the application server architecture described herein. For administration purposes, one or more administrator computers 28 may also be coupled to network 14. In addition, it will be appreciated that various other types of components may be coupled to network 14, e.g., external backend storage 30 such as a storage area network, network addressed storage, or various other persistent storage systems known in the art.

Each computer 12 is further configured to host a number of levels of software suitable for implementing a clustered or distributed computing environment. Shown resident in memory 18 is operating system and/or middleware program code 32, as well as application server environment program code 34, e.g., the WebSphere Extended Deployment environment available from International Business Machines Corporation, the assignee of the present invention.

Within the application server environment, high availability functionality may be supported in the form of a clustering component 36, within which resides one or more members 38 that form groups or clusters in the application server environment. It will be appreciated that groups or clusters will typically have members resident on different clustered computers 12, or nodes, and that individual nodes may host single or multiple members of a given group or cluster. Clustered computers may also utilize logical partitioning, whereby a single physical machine may implement multiple nodes in the system. It will also be appreciated that not every node in the clustered computer system have a member for each active group.

A cache framework 40, such as the ObjectGrid cache framework available in the aforementioned WebSphere Extended Deployment application server environment, is also resident in each member 38, and provides an object cache 42 capable of being accessed by one or more server applications 44. As will be appreciated by one of ordinary skill in the art having the benefit of the instant disclosure, object cache 42 is automatically replicated across multiple nodes in the clustered computer system by clustering infrastructure 36, with the member 38 on one of the clustered computers 12 operating as a primary member, and the members 38 on the other clustered computers 12 serving as replica or backup members.

Also illustrated in FIG. 1 is a loader component 46, which is the software component that manages the overall process of performing a preload operation on cache 42. Loader component 46 is typically a plug-in component to the cache framework that is specific to the data that is maintained in a particular cache, but that relies on functions supported in the cache framework to manage the preloading processing. As such, loader component may perform any number of different operations to retrieve data to be maintained in cache 42, e.g., querying an external database, retrieving data from external storage, mapping data to a memory space, mapping data to keys, formatting the cache, etc. Due to the application-specific nature of most caches, the loader component is typically separate from the cache framework. In the alternative, a generic loader component may be implemented directly within the cache framework in other embodiments of the invention.

The discussion hereinafter will focus on the specific routines utilized to implement the above-described cache preloading functionality. The routines executed to implement the embodiments of the invention, whether implemented as part of an operating system or a specific application, component, program, object, module or sequence of instructions, will also be referred to herein as "computer program code," or simply "program code." The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical, recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. For example, the invention may be implemented in a clustered computer system where clustering is not implemented within an application server environment. Those skilled in the art will recognize that other alternative hardware and/or software environments may be used without departing from the scope of the invention.

FIG. 2 next illustrates a class diagram of a number of software components that may be utilized in the clustered computer system of FIG. 1 to implement a recoverable cache preload operation in a Java-based environment. In particular, FIG. 2 illustrates a MyLoader class 50 that implements a Loader interface 52 and ReplicaPreloadController interface 54. Loader interface 52 defines three methods, a preloadCache( ) method that is used to initiate a preload of a cache, a get( ) method that is used to retrieve an object from the cache, and a batchUpdate( ) method that is used to issue multiple commands to a cache as a set. The Loader interface also defines a KEY_NOT_FOUND value that is returned in response to a get( ) operation when no data is found for the key supplied in the function call.

ReplicaPreloadController interface 54 defines an additional method, checkPreloadStatus( ), which is used to retrieve a preload status from a Status class 56. The status class 54 may be implemented, for example, with a status( ) method that returns one of three values: PRELOADED_ALREADY, FULL_PRELOAD_NEEDED, and PARTIAL_PRELOAD_NEEDED, indicating respectively that the preloading of the cache is complete, that the preloading of the cache must be restarted from the beginning, and that the preloading of the cache was interrupted prior to completion, and that some of the data already preloaded into the cache can be retained. The interface may also define an equals( ) method that compares the stored status of the cache with a token value supplied as an argument to the method.

The status class is used to communicate the status of the preloaded cache back to the cache framework, and is determined by the Loader class after analyzing it's preload status information, e.g., as stored in a "state cache." The "state cache" typically includes specific state data related to the preload processing, e.g., items like the last key loaded, the last key in the sequence, the last data loaded, etc. In the illustrated embodiment, the Loader class analyzes this data and determines the proper status value to pass back to the cache framework.

In the illustrated embodiment, each cache is implemented as a mapset data structure. A map, in turn, includes a set of key-value pairs, where each key is unique and is used to access data associated with the key. Key-value pairs may be accessed via hash functions or hash tables, where the key is used as a key for the purposes of the hash function. A single mapset may constitute the entire runtime storage for the cache framework, or in the alternative, a cache framework may rely on multiple mapsets. By virtue of the replication functionality in the cache framework, each mapset in a cache framework is typically replicated automatically in all members of the group that hosts the cache framework, with one member being designated a primary member to handle the preloading, updating and accessing of the mapset during runtime.

As such, in the illustrated embodiment the preload status for a map or mapset may be implemented itself as a map, and associated within the same mapset as any map or mapset with which the preload status data is associated. By doing so, the preload status information is persisted and replicated along with the other data in the map via the cache framework, and as such, will be available to any replica member that takes over as a primary member after a failure.

Various types of status information may be maintained in a status map, e.g., a done flag and an indication of a last key successfully loaded. Other information that may be useful for indicating what data has been successfully loaded and/or where a resumed preload operation should start may also be stored as preload status information. In addition, in instances where the data being preloaded is non-sequential in nature, more detailed information than simply a last key loaded and/or more complex logic may be required to provide an indication of what data has and/or remains to be loaded in a cache. It will be appreciated that other data structures may be used to store preload status information, and that other manners of persisting the preload status information may be used consistent with the invention, to ensure that the preload status information is accessible to a replica member attempting to resume an interrupted preload operation. For example, preload status information may be stored in a file in a network file system, in a table in a distributed database, incorporated directly into a data cache or map, etc.

As noted above, in the illustrated embodiment, the status map is typically updated by a Loader object with each preload operation, and as the primary member's contents are transferred to each replica member, the preload status data is likewise transferred to each replica member. Then, if a primary member fails over to a replica member, the state of the preload operation can be queried from this status map, the Loader object can be properly "initialized" to this interim state, and the cache framework can be informed that a partial preload is necessary.

FIG. 3 is an interaction diagram illustrating the interaction between the components in the clustered computer system of FIG. 1 during a recoverable cache preload operation. In particular, FIG. 3 illustrates the interaction of a cache framework 60, a replica preload controller 62, a loader 64 and a cache 66. As noted above in connection with FIG. 2, replica preload controller 62 and loader 64 may be implemented in a single MyLoader class, an instantiation of which is illustrated in FIG. 1 by loader 44. Alternatively, these interfaces may be implemented in separate classes.

As shown in steps A1-A2, a preload operation performed during initialization of a cache framework by a primary member may call the checkPreloadStatus( ) method on replica preload controller 62 to first determine the state of any previous preload operation performed on the cache, e.g., by another primary member (step A1). The result of the method call is the return of a status (step A2). The status in the illustrated embodiment identifies one of three states, as discussed above: PRELOADED_ALREADY, FULL_PRELOAD_NEEDED, and PARTIAL_PRELOAD_NEEDED. If this is the first attempt at preloading the cache, the status returned will be FULL_PRELOAD_NEEDED. The same status will also be returned on a subsequent preload operation if it is determined by the loader that the earlier preload operation did not complete and insufficient information exists to continue the prior preload operation from the point at which it was interrupted. The status may also be returned if a previous primary member had not yet begun preloading the cache when a failover occurred.

If the cache was successfully preloaded before a failover to a replica member, a PRELOADED_ALREADY status is returned, indicating that the cache is already preloaded and ready for use. If the cache was interrupted in the middle of preloading the cache, and suitable cache state information has been stored in order to permit the existing preloaded data to be retained and the preload to continue from the point of interruption, a PARTIAL_PRELOAD_NEEDED status is returned. It will be appreciated that the recovery of the preload status data, and the determination of whether sufficient information exists to continue the prior preload operation are typically implementation-specific, and will vary depending upon the design and contents of the particular cache being preloaded.

If a PRELOADED_ALREADY status is returned in step A2, no further action need be performed by a member attempting to preload the cache. On the other hand, if a FULL_PRELOAD_NEEDED status is returned in step A2, the actions set forth in steps B1-B6 are performed in order to perform a full preload of the cache. In particular, in step B1 the cache framework clears the cache in the appropriate manner for the cache at issue in order to discard any data that may be present in the cache. A confirmation of the clearing of the cache is then returned to the cache framework in block B2. Next, in block B3, the cache framework calls the preloadCache( ) method on the loader to initiate the preload operation. The loader then performs a preload of the cache (step B4), with an appropriate confirmation received from the cache (step B5) upon completion of the cache preload. Once the preload of the cache is complete, the loader confirms completion with the cache framework in step B6.

If a PARTIAL_PRELOAD_NEEDED status is returned in step A2, the actions set forth in steps C1-C4 are performed in order to continue with the interrupted preload performed by the previous primary member. In particular, in block C1, the cache framework calls the preloadCache( ) method on the loader to initiate the preload operation. The loader then performs a preload of the cache (step C2), with an appropriate confirmation received from the cache (step C3) upon completion of the cache preload. Once the preload of the cache is complete, the loader confirms completion with the cache framework in step C4.

It will be appreciated that the actions performed by the loader when preloading the cache (steps B4 and C2) are typically implementation-specific, and will vary depending upon the type of data being preloaded, the organization of the cache, and the source of the data being preloaded into the cache (e.g., where the data is sourced from a database, the actions performed by the loader may include multiple queries to a backend database, conversion of data formats, etc.). Steps B4 and C2 typically perform the same actions as one another, but the actions performed in step B4 start from the beginning of the preload operation, while the actions performed in step C2 are initiated by the loader at an intermediate point as determined from the preload status information, e.g., as stored in an associated state map or cache.

Figure 4:
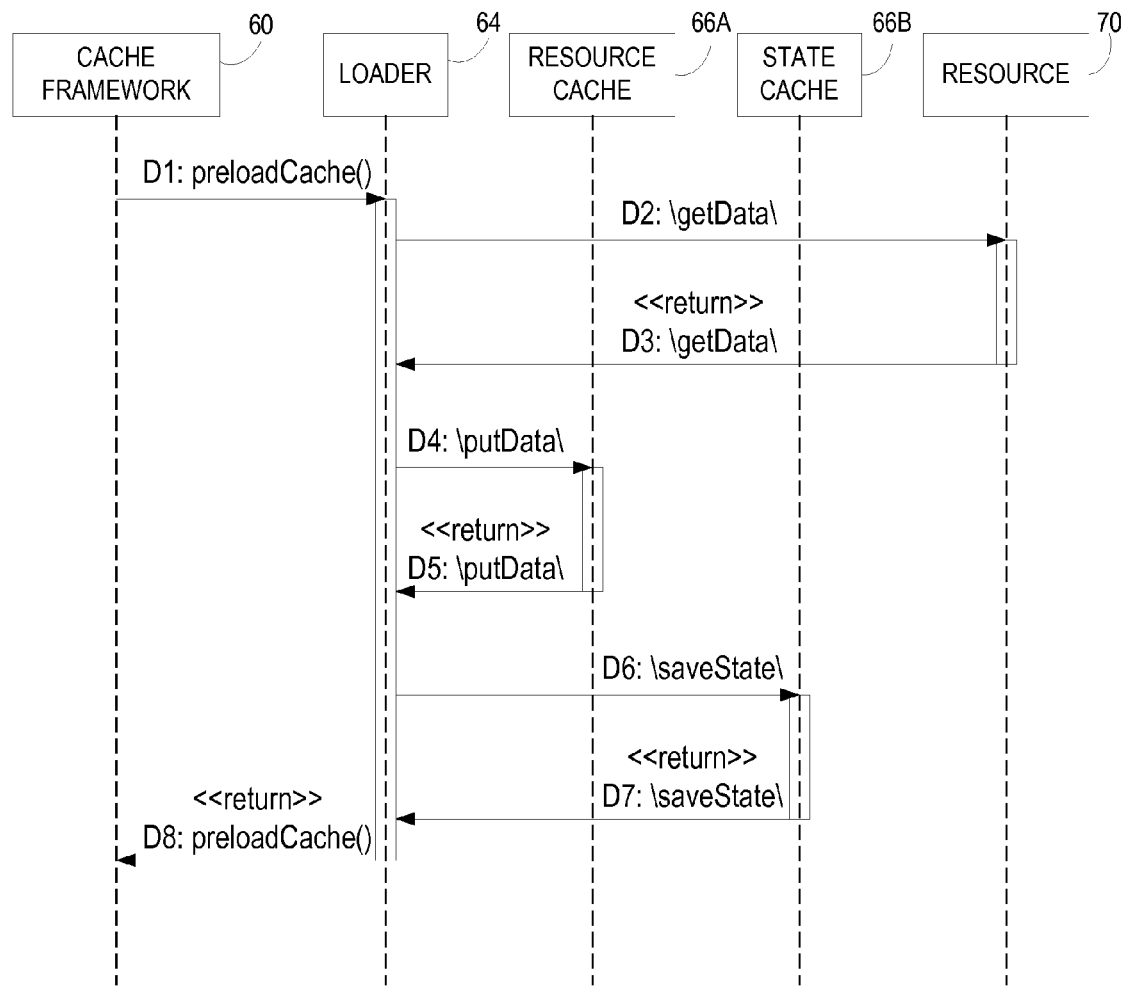
FIG. 4 is an interaction diagram illustrating in greater detail the loading of data and saving of status information during the recoverable cache preload operation of FIG. 3.

FIG. 4, for example, illustrates one suitable implementation of the cache preload actions performed by a loader in steps B4 and C2 of FIG. 3. FIG. 4, in particular, illustrates in steps D1-D8 the actions that occur in response to a preloadCache( ) call by cache framework 60 to loader 64. In this figure, the cache 66 has been separated into a separate resource or data cache 66A, representing the mapset for the information being preloaded into the cache, and a state cache 66B, representing the state map within which preload status information is stored during a preload operation. A resource 70, representing the external source of the data being preloaded into the cache (e.g., a backend repository, a backend database, etc.), is also illustrated in FIG. 4.

In response to a preloadCache( ) call to loader 64, the loader typically accesses resource 70 to retrieve the desired data (step D2), and once the data is successfully retrieved (step D3), the loader proceeds to load or put the retrieved data in resource cache 66A (step D4). Once the data has been successfully stored in the cache, as confirmed in step D5, the loader then updates the preload status information in state cache 66B to reflect on the successful preloading of the retrieved data into the cache. A confirmation of the update to the state cache is then received in step D7.

Steps D2-D7 are repeated for each set of data being preloaded into the cache. The granularity of the data that is preloaded into the cache will typically vary depending upon the implementation, although it will be appreciated that the granularity is desirably selected such that the preload status information is updated on a relatively timely basis, given that any preload operation being performed by a replica member after a failure in a primary member during a preload operation will typically start from the point at which the preload status information was last updated.

Once all of the data has been preloaded in the cache, loader 64 returns control to the cache framework (step D8), typically also setting an indication in the preload status information that preloading of the cache is complete. The cache preload operation is then complete.

Various modifications may be made to the illustrated embodiments without departing from the spirit and scope of the invention. Therefore, the invention lies in the claims hereinafter appended.

What is claimed is:

1. A method of preloading a cache in a clustered computer system, the method comprising:
    monitoring a preload state of a cache during preloading of the cache by a first member of a group;
    in response to a failure in the first member, failing over to a second member of the group; and
    selectively preloading the cache with the second member based upon the preload state of the cache after failing over to the second member.

2. The method of claim 1, wherein monitoring the preload state includes storing preload status information during preloading of the cache, and wherein selectively preloading the cache with the second member includes retrieving the preload status information after the failure in the first member.

3. The method of claim 1, wherein selectively preloading the cache with the second member includes skipping preloading of the cache if the preload state of the cache indicates that the cache was fully preloaded prior to failure in the first member.

4. The method of claim 1, wherein selectively preloading the cache with the second member includes restarting preloading of the cache based upon the preload state of the cache.

5. The method of claim 4, wherein restarting preloading of the cache is performed if the preload state of the cache indicates that the first member had not yet begun preloading the cache as of the failure in the first member.

6. The method of claim 4, wherein restarting preloading of the cache is performed if the preload state of the cache indicates that the cache cannot be recovered.

7. The method of claim 1, wherein selectively preloading the cache with the second member includes starting preloading of the cache by the second member from an intermediate point such that at least a portion of any preloading of the cache performed by the first member is retained in the cache.

8. The method of claim 7, wherein selectively preloading the cache with the second member further includes determining the intermediate point from the preload state.

9. The method of claim 1, further comprising updating the preload state after each of a plurality of preload operations performed by the first member.

10. A method of preloading a cache in a clustered computer system, the method comprising:
    initiating preloading of a cache by a first member of a group;
    in response to a failure in the first member prior to completing the preload of the cache and after at least a portion of the cache has been preloaded, failing over to a second member of the group; and
    after failing over to the second member, retaining the preloaded portion of the cache and completing the preload of the cache with the second member.

11. The method of claim 10, further comprising:
    monitoring a preload state of the cache during preloading of the cache by the first member;
    retrieving the preload state of the cache after the failure in the first member; and
    determining an intermediate point at which to start preloading the cache with the second member from the retrieved preload state.

12. The method of claim 11, further comprising updating the preload state after each of a plurality of preload operations performed by the first member.

13. A method of preloading a cache in a clustered computer system of a type including a group including first and second members, wherein the first member is configured to preload the cache, the method comprising:

accessing a preload state of the cache with the second member after a failure has occurred in the first member and a failover to the second member has been initiated; and selectively preloading the cache with the second member based upon the preload state of the cache after failing over to the second member.

14. An apparatus, comprising:

at least one hardware-based processor; and program code configured to be executed by the at least one processor to preload a cache in a clustered computer system of the type including a group including a plurality of members, the program code associated with one of the plurality of members and configured to, in connection with a failover initiated after a failure in another member of the group, access a preload state for the cache prior to initiating a preload of the cache to determine whether at least a portion of the cache has already been preloaded by the other member of the group.

15. The apparatus of claim 14, wherein the program code is further configured to selectively preload the cache based upon the preload state, and update the preload state during selective preloading of the cache.

16. The apparatus of claim 15, wherein the program code is configured to selectively preload the cache by skipping preloading of the cache if the preload state of the cache indicates that the cache was fully preloaded prior to failure in the other member.

17. The apparatus of claim 15, wherein the program code is configured to selectively preload the cache by restarting preloading of the cache based upon the preload state of the cache.

18. The apparatus of claim 17, wherein the program code is configured to restart preloading of the cache if the preload state of the cache indicates that the other member had not yet begun preloading the cache as of the failure in the other member.

19. The apparatus of claim 17, wherein the program code is configured to restart preloading of the cache if the preload state of the cache indicates that the cache cannot be recovered.

20. The apparatus of claim 15, wherein the program code is configured to selectively preload the cache by starting preloading of the cache from an intermediate point such that any preloading of the cache performed by the other member is retained in the cache.

21. The apparatus of claim 20, wherein the program code is configured to selectively preload the cache further by determining the intermediate point from the preload state.

22. The apparatus of claim 14, wherein the at least one processor and the program code are resident in a first node of the clustered computer system, the apparatus further comprising a second node upon which is resident the other member of the group, the second node including second program code configured to monitor the preload state of the cache during preloading of the cache by the other member of the group.

23. The apparatus of claim 22, wherein the second program code is configured to monitor the preload state by storing preload status information during preloading of the cache, and wherein the first program code is configured to access the preload state by retrieving the preload status information after failure in the other member.

24. The apparatus of claim 23, wherein the second program code is configured to update the preload state after each of a plurality of preload operations performed by the first member.

25. A program product, comprising:

program code configured upon execution to preload a cache in a clustered computer system of the type including a group including a plurality of members, the program code associated with one of the plurality of members and configured to, in connection with a failover initiated after a failure in another member of the group, access a preload state for the cache prior to initiating a preload of the cache to determine whether at least a portion of the cache has already been preloaded by the other member of the group; and a recordable type computer readable medium storing the program code.

* * * * *